(12) United States Patent
Kato

(10) Patent No.: US 8,597,749 B2
(45) Date of Patent: Dec. 3, 2013

(54) HIGH-SOLID ANTICORROSIVE COATING COMPOSITION

(75) Inventor: Osamu Kato, Ohtake (JP)

(73) Assignee: Chugoku Marine Paints, Ltd., Ohtake-shi (JP)

( * ) Notice: Subject to any disclaimer, the term of this patent is extended or adjusted under 35 U.S.C. 154(b) by 915 days.

(21) Appl. No.: 12/282,218

(22) PCT Filed: Mar. 8, 2007

(86) PCT No.: PCT/JP2007/054579
§ 371 (c)(1),
(2), (4) Date: Sep. 9, 2008

(87) PCT Pub. No.: WO2007/102587
PCT Pub. Date: Sep. 13, 2007

(65) Prior Publication Data
US 2009/0042036 A1    Feb. 12, 2009

(30) Foreign Application Priority Data

Mar. 9, 2006 (JP) ................................. 2006-064869

(51) Int. Cl.
*B32B 27/38* (2006.01)
*B32B 1/02* (2006.01)
*C08G 59/18* (2006.01)

(52) U.S. Cl.
USPC .......................... 428/35.7; 428/413; 525/396

(58) Field of Classification Search
USPC .......... 428/35.7, 413; 524/413, 423, 431, 449, 524/451, 611; 525/396
See application file for complete search history.

(56) References Cited

U.S. PATENT DOCUMENTS 5,536,775 A * 7/1996 Curatolo et al. ............... 525/530
2009/0226729 A1 * 9/2009 Niimoto et al. ............... 428/416

FOREIGN PATENT DOCUMENTS

| EP | 1 788 048 A1 | 5/2007 | |
|----|--------------|--------|---|
| JP | 3 275773 | 12/1991 | |
| JP | 2001 279167 | 10/2001 | |
| JP | 2001-279167 | * 10/2001 | ........... C09D 163/00 |
| JP | 2002 69367 | 3/2002 | |
| JP | 2002 80564 | 3/2002 | |
| JP | 2003 171611 | 6/2003 | |
| WO | 2006 016625 | 2/2006 | |

OTHER PUBLICATIONS

Machine Translation of JP 2001-279167, Oct. 2001.*
Translation of the abstract for JP 3-275773 (Dec. 6, 1991).*

* cited by examiner

*Primary Examiner* — Erik Kashnikow
(74) *Attorney, Agent, or Firm* — Oblon, Spivak, McClelland, Maier & Neustadt, L.L.P.

(57) ABSTRACT

A high solid type paint composition comprising (A) a main component containing a semi-solid state bisphenol type epoxy resin (a1) wherein the epoxy equivalent weight of the epoxy resin is 250 to 300, and (B) a curing component containing an epoxy adduct of xylylenediamine (b1) and an epoxy adduct of polyamide (b2), wherein the epoxy adduct of polyamide (b2) is contained at 50 to 200 parts by weight per 100 parts by weight of the epoxy adduct of xyleylenediamine (b1 ). The anticorrosive coating composition is excellent in drying properties during coating, and capable of forming a coating film having excellent oil resistance, solvent resistance, chemical resistance and anticorrosive properties.

21 Claims, No Drawings

# HIGH-SOLID ANTICORROSIVE COATING COMPOSITION

TECHNICAL FIELD

The present invention relates to a high solid type (namely, with a high content of non-volatile components and a low content of volatile organic components) anticorrosive coating composition capable of forming a coating film having excellent drying properties during coating as well as having excellent oil resistance, solvent resistance, chemical resistance and anticorrosive properties, which is suitable for coating a ship oil tank, for example, and to applications thereof.

BACKGROUND ART

Conventionally, a solid bisphenol A (BPA) type epoxy resin or a novolac epoxy resin and a modified epoxy compound such as diethylenetriamine (DETA) adduct are used (blended) for a coating material capable of forming a coating film having excellent oil resistance, solvent resistance, chemical resistance and anticorrosive properties for use in the inner surface of a product carrier tank or the like. These coating materials can provide a coating film excellent in oil resistance, solvent resistance and chemical resistance. However, as they contain a relatively high molecular weight resin, they require a large amount of solvent in terms of coating workability and others, and it is difficult to make them a high solid type. If the amount of the solvent is reduced to make them a high solid type, oil resistance, solvent resistance and chemical resistance of the obtained anticorrosive coating film would be inferior to those of the conventional products without reduction of the amount of solvent.

If an epoxy adduct of an amine compound having a reduced ratio of an epoxy adduct is used in combination with a relatively high molecular weight resin to make them a high solid type, the coating material obtained has drying properties inferior to the conventional products. On the other hand, if a low molecular weight amine is used, the drying rate decreases.

Furthermore, a high solid type coating material using a modified polyamine such as cardanol or the like is available in the market. However, oil resistance, solvent resistance and chemical resistance of the coating film obtained are inferior to those of a coating material using a modified amine epoxy compound such as an adduct of diethylene triamine (DETA) and either a bisphenol A (BPA) type epoxy resin or a novolac epoxy resin.

JP-A-1995(H3)-275773 (Patent Document 1, corresponding to JP-B-2505301) discloses "a heavy-duty anticorrosive coated steel obtained by putting a coating layer on pretreated surface of the steel, wherein the coating layer material contains (a) a bisphenol type liquid epoxy resin having 2 or more epoxy groups in one molecule with an epoxy equivalent weight of less than 250, (b) a curing agent containing 10 to 100 parts by weight of an aliphatic polyamide amine or an epoxy compound modified with an aliphatic polyamide amine per 100 parts by weight of a modified amine of xylylenediamine or iso-phorone diamine with an epoxy resin, and (c) 20 to 65 wt %, as Pigment Weight Content, of a pigment".

However, a coating film formed from the coating material for the heavy-duty anticorrosive coating of steel disclosed in the Patent Document 1 is inferior in oil resistance, solvent resistance and chemical resistance, and has a serious problem particularly in solvent resistance, such that a significant blister takes place in half a day when dipped in a solvent such as EDC, MEK or benzene at room temperature.

[Patent Document 1] JP-A-1995(H3)-275773 (corresponding to JP-B-2505301)

DISCLOSURE OF THE INVENTION

Problems to be Solved by the Invention

Accordingly, it is an object of the present invention to solve the above-mentioned problems associated with the prior arts, and to provide a high solid type anticorrosive coating composition capable of forming a coating film having excellent drying properties of the unhardened film (drying quickly) during coating on a base material, as well as capable of forming a coating film having excellent oil resistance, solvent resistance, chemical resistance and anticorrosive properties on the surface of the base material.

In other words, an object of the present invention is to provide a high solid type anticorrosive coating composition suitable not only for coating a pipeline and the like but also for coating the inner surface of the tanks in a product carrier or a chemical tanker, where high oil resistance, solvent resistance and chemical resistance are required in addition to anticorrosive properties.

Means for Solving the Problems

The high solid type anticorrosive coating composition of the present invention comprises (A) a main component containing a semi-solid state bisphenol type epoxy resin having epoxy equivalent weight of 250 to 300 (a1), (B) a curing component containing an epoxy adduct of xylylenediamine (b1) and an epoxy adduct of polyamide (b2), wherein the above curing component (B) contains 50 to 200 parts by weight of the epoxy adduct of polyamide (b2) per 100 parts by weight of the epoxy adduct of xylylenediamine (b1).

With regard to the semi-solid state bisphenol type epoxy resin (a1) contained in the main component (A), an epoxy equivalent weight of 260 to 280 is more preferable from the viewpoint of the physical properties of the coating film.

Moreover, from the viewpoint of oil resistance, solvent resistance and chemical resistance of the coating film, it is more preferable that the curing component (B) contains 70 to 150 parts by weight of the epoxy adduct of polyamide (b2) per 100 parts by weight of the epoxy adduct of xylylenediamine (b1).

Furthermore, because of the tendency of the coating film to have excellent crosslinking density, oil resistance, solvent resistance, chemical resistance, water resistance and adhesion to a base material, the ratio of active hydrogen in the curing component (B) to the epoxy group in the main component (A) is preferably in the range of 0.8 to 1.0.

Moreover, in the present invention, from the viewpoint of increasing adhesion of the coating film to a base material to improve water resistance and the like, one of the preferred embodiments is that the main component (A) or the curing component (B) contains a silane coupling agent, and that the ratio is 0.1 to 4 parts by weight per 100 parts by weight of the main component (A).

Furthermore, in the present invention another preferred embodiment is that the main agent component (A) or the curing component (B) contains an extender pigment (preferably at least one extender pigment selected from the group consisting of silica, talc, mica and barium sulfate). When the extender pigment is added to the paint composition of the present invention, the ratio of the extender pigment used is preferably 20 to 70 parts by weight per 100 parts by weight of the main component (A).

Moreover, in the present invention, another preferred embodiment is that the main component (A) or the curing component (B) contains a coloring pigment (preferably at least one coloring pigment selected from the group consisting of titanium white, carbon black and red iron oxide). When the coloring pigment is added to the coating composition of the present invention, the ratio of the coloring pigment used is preferably 1 to 20 parts by weight per 100 parts by weight of the main component (A).

When at least one of the above-mentioned extender pigment and the coloring pigment is added to the coating composition of the present invention, the volume content of the total pigments (Pigment Volume Content, PVC) including extender and coloring pigments is preferably 20 to 50%, and more preferably 25 to 45%, in order to maintain the effect of stress relaxation and water resistance of the coating film as well as the coating workability at an appropriate level.

The total amount of the bisphenol type epoxy resin (a1), the epoxy adduct of xylylenediamine (b1) and the epoxy adduct of polyamide (b2), namely {(a1)+(b1)+(b2)} in the anticorrosive coating composition is preferably 15 to 45 wt %, and more preferably 20 to 40 wt %, from the viewpoint of oil resistance, chemical resistance, solvent resistance and water resistance of the coating film obtained.

The anticorrosive coating composition of the present invention can be utilized as a coating composition particularly for coating a ship or a ship tank. By applying such paint composition on the surface of a base material (for example, a ship tank), a coating film is formed providing the base material with various characteristics such as oil resistance, solvent resistance, chemical resistance and anticorrosive properties. In other words, coating the above-mentioned base material with such coating film is suitable as a method for preventing corrosion. Furthermore, the above-mentioned base material coated by such a coating film has the various excellent properties mentioned above.

Effect of the Invention

According to the present invention, while limiting the content of a volatile organic component such as a solvent in the coating composition (namely, as a high solid type composition), the coating composition capable of forming a coating film excellent in various properties such as drying properties during coating, oil resistance, solvent resistance, chemical resistance and anticorrosive properties is obtained. Furthermore, by applying the coating composition of the present invention, various excellent properties as mentioned above can be provided to various base materials (for example, ship tank).

BEST MODE FOR CARRYING OUT THE INVENTION

In the following, the high solid type anticorrosive coating composition of the present invention, the anticorrosive coating film formed from the coating composition, the base material coated with the coating film, the ship tank coated with the coating film formed from the above-mentioned anticorrosive coating composition, and the method of preventing corrosion of the base material surface will be explained in detail.

The coating composition of the present invention is referred to as "anticorrosive coating composition" because it is particularly excellent in anticorrosive properties, but included in the preferred embodiments of the coating composition of the present invention are not only the composition used to provide the base material with anticorrosive properties but also the composition used to provide oil resistance, solvent resistance, chemical resistance and the like or the composition used with a view to providing adhesive properties commonly observed in epoxy resin-based coating compositions.

As for the definition of the amount of the components contained in the coating composition of the present invention, the weight of the "coating composition" or the "main component (A)" referred as the base, unless otherwise noted, is the weight of solid part alone excluding volatile solvents such as toluene or methylisobutyl ketone.

High Solid Type Anticorrosive Coating Composition

The high solid type anticorrosive coating composition of the present invention (hereinafter, it may be simply referred as "the coating composition") contains a specific epoxy resin based main component (A) and a specific amine based and amide based curing components (B). These components (A) and (B) are normally kept, stored and transported separately in different containers, and are mixed together just before use. Therefore, the coating composition of the present invention is a so-called two-component coating composition.

The specific definition of "high solid type" for the anticorrosive coating composition of the present invention is that the VOC during coating is 340 g/L (regulated value in the USA) or less.

From the viewpoint of reaction efficiency (rapid and uniform curing of the coating composition), as well as oil resistance, solvent resistance, chemical resistance, solvent resistance, water resistance and adhesion to a base material of the coating film obtained, the ratio of the total number of active hydrogen groups in the epoxy adduct of xylylenediamine (b1) and the epoxy adduct of polyamide (b2) in the curing component (B) to the number of epoxy groups in the epoxy resin (a1) in the main component (A) is desirably in the range of 0.5 to 1.0, and more desirably 0.8 to 1.0.

Therefore, from the viewpoint as mentioned above, normally 5 to 25 parts by weight, preferably 10 to 20 parts by weight of the curing component (B) is used per 100 parts by weight of the main component (A) (including the weight of volatile solvent).

Furthermore, it can also be said that the main component (A) and the curing component (B) are used in such an amount that the total amount of the epoxy adduct of xylylenediamine (b1) and the epoxy adduct of polyamide (b2), namely {(b1)+(b2)} is normally 20 to 60 parts by weight, and preferably 30 to 50 parts by weight per 100 parts by weight of the epoxy resin (a1) in the main component (A).

In the following, the main component (A) and the curing component (B) will be explained in more detail.

<Main Component (A)>

The main component (A) as a component composing the high solid type anticorrosive coating composition of the present invention contains a semi-solid state bisphenol type epoxy resin having a specific epoxy equivalent weight.

From the viewpoint of obtaining a coating film excellent in the various properties, the epoxy equivalent weight as mentioned above is in the present invention normally in a range from 250 to 300 (g/equiv), preferably 260 to 280 (g/equiv).

The definition of "semi-solid state" of the bisphenol type epoxy resin (a1) is that the viscosity at ordinary temperature (measured under the conditions of 23° C., 85% concentration in xylene as solvent, using E-type FMD viscometer manufactured by TOKIMEC Co., Ltd.) is normally in the range of 4500 to 5500 mPa·s, and preferably 4000 to 5000 mPa·s.

In the present invention, bisphenol type (A type or F type) epoxy resin is used because it can provide a coating film having excellent adhesion to base material and anticorrosive properties, and bisphenol A type is particularly preferable among them. The "epoxy resin" includes a polymer or an oligomer having 2 or more epoxy groups in a molecule, as well as a polymer or an oligomer formed by ring-opening reaction of the epoxy group (collectively called "ring-opening reaction product").

Examples of the bisphenol A type epoxy resin mentioned above include a polycondensate of bisphenol A type di-glycidyl ether such as bisphenol A di-glycidyl ether, bisphenol A propylene oxide di-glycidyl ether, bisphenol A ethylene oxide di-glycidyl ether, hydrogenated bisphenol A di-glycidyl ether, hydrogenated bisphenol A propylene oxide di-glycidyl ether, and the like.

Examples of the representative epoxy resin products which can be used in the present invention include "E-834-85X (PC)" produced by Ohtake-Meishin Chemical Co., Ltd. (epoxy equivalent weight: 260 to 280, viscosity: about 4000 mPa·s, property: semi-solid state), "Epicoat 834" produced by Japan Epoxy Resins Co., Ltd. (bisphenol A type epoxy resin, epoxy equivalent weight: 230 to 270, viscosity by Gardner/Holz method: P-U/25° C.), and the like.

These bisphenol type epoxy resins can be used alone or in a combination of two or more kinds. When two or more kinds are used in combination, the molecular weight and the epoxy equivalent weight of the bisphenol A type epoxy resin (a1) are defined to be the average of the resins used.

In the main component (A), a small amount of epoxy resin of a type other than bisphenol A such as glycidyl ester type, glycidyl amine type, phenol novolac type, cresol type, dimeric acid-modified type, aliphatic type, alicyclic type, epoxidized oil type and the like may be used together with the bisphenol A type as long as the effects of the present invention are not depressed.

Viscosity, epoxy equivalent weight, average molecular weight and the like of the bisphenol type epoxy resin (a1) may be suitably adjusted within the predetermined range, considering factors, in addition to the effect of the present invention, such as curing conditions (e.g., air-drying coating, baking finish coating), coating workability and the like of the coating composition.

In the present invention, in view of adhesion to a base material, water resistance and anticorrosive properties of the coating film obtained, the content of the bisphenol type epoxy resin (a1) in the main component (A) (including volatile solvent) is normally 15 to 45 wt %, and preferably 20 to 40 wt %.

Based on the weight of the solid component excluding volatile solvent in the main component (A), the content of the bisphenol type epoxy resin (a1) is, in the same sense of the term as above, normally 18 to 55 parts by weight, and preferably 25 to 45 parts by weight per 100 parts by weight of the solid component.

<Curing Component (B)>

The curing component (B), which is another component composing the high solid type anticorrosive coating composition of the present invention, contains the epoxy adduct of xylylenediamine (b1) and the epoxy adduct of polyamide (b2) in a specific ratio.

The epoxy adduct of xylylenediamine (b1) is obtained by reacting xylylenediamine with an epoxy resin such as a bisphenol A type epoxy resin. The epoxy resin used in this reaction has normally a lower molecular weight (for example, an epoxy equivalent weight of 184 to 194, and an average molecular weight of 368 to 388) than the epoxy resin in the main component (A) mentioned above.

The epoxy adduct of polyamide (b2) is obtained by reacting a polyamide with the same epoxy resin as used for (b1).

Examples of the epoxy adduct of xylylenediamine (b1) mentioned above include the commercial products such as "NAD 200P" (MXDA (methaxylylenediamine) epoxy adduct, viscosity: 1000 to 1500 mPa·s) produced by Ohtake-Meishin Chemical Co., Ltd, and the example of the epoxy adduct of polyamide (b2) include "PA297P" (viscosity: 4000 to 7000 mPa·s) produced by Ohtake-Meishin Chemical Co., Ltd.

The coating composition of the present invention contains, from the viewpoint of physical properties, oil resistance, solvent resistance, chemical resistance and water resistance of the obtained coating film, normally 50 to 200 parts by weight, and preferably 70 to 150 parts by weight of the epoxy adduct of polyamide (b2) per 100 parts by weight of the epoxy adduct of xylylenediamine (b1). If the content of the epoxy adduct of polyamide (b2) exceeds the above range, a relative content of the solvent increases, which makes it difficult to obtain a high solid type composition, and drying properties of the uncured coating film just after coating tends to be inferior. On the other hand, if the content is lower than above range, properties of the coating film, particularly oil resistance, solvent resistance and chemical resistance tend to be inferior.

In the coating composition of the present invention, in view of excellent crosslinking density, oil resistance, solvent resistance, chemical resistance and water resistance of the coating film obtained, the total amount of the bisphenol type epoxy resin (a1), the epoxy adduct of xylylenediamine (b1) and the epoxy adduct of polyamide (b2), namely {(a1)+(b1)+(b2)} is 15 to 45 wt %, and preferably 20 to 40 wt % of the paint composition.

<Silane Coupling Agent>

In the present invention, addition of one or two or more kinds of silane coupling agent in the main component (A) and/or the curing component (B) is preferable to improve adhesion strength of the coating film to a base material, as well as water resistance.

As the silane coupling agent mentioned above, those compounds publicly known can be used. In the present invention, a silane coupling agent containing at least one reactive functional group selected from the group consisting of amino group, carboxyl group, hydroxyl group, epoxy group and glycidyl group, preferably that of containing an epoxy group is desirably used.

Specific examples of the above-mentioned silane coupling agent containing epoxy group include those shown in (1) to (5) in Table 1 below. Particularly, (3,4-epoxycyclohexyl) ethyl trimethoxy silane as shown in (1), and γ-glycidoxypropyl trimethoxy silane as shown in (2) (produced by Dow Corning Toray Co., Ltd. "SH6040" etc.) are preferable. In addition, γ-glycidoxy propylmethyl dimethoxy silane as shown in (3) (produced by Dow Corning Toray Co., Ltd. "AY43-026"), and γ-glycidoxy propylmethyl diethoxy silane as shown in (4) may be used.

TABLE 1

| NO. | Chemical Name | Structural formula | Product name | Molecular weight | Specific gravity (25° C.) | Refractive index (25° C.) | Flash point (° C.) |
|---|---|---|---|---|---|---|---|
| 1 | (3,4-epoxy cyclohexyl) ethyl trimethoxy silane | (structure with OMe, Si—OMe, OMe) | Shin-Etsu Chemical Co., Ltd. KBM-303; Nippon Unicar Co., Ltd. A-186 | 246.3 | 1.07 | 1.45 | 146 |

TABLE 1-continued

| NO. | Chemical Name | Structural formula | Product name | Molecular weight | Specific gravity (25° C.) | Refractive index (25° C.) | Flash point (° C.) |
|---|---|---|---|---|---|---|---|
| 2 | γ-glycidoxy propyl trimethoxy silane | (structure with OMe, Si—OMe, OMe) | Shin-Etsu Chemical Co., Ltd. KBM-403; Nippon Unicar Co., Ltd. A-187 | 236.3 | 1.07 | 1.43 | 135 |
| 3 | γ-glycidoxy propyl methyl dimethoxy silane | (structure with Me, Si—OMe, OMe) | Shin-Etsu Chemical Co., Ltd. KBM-402; Nippon Unicar Co., Ltd. AZ-6137 | 220.3 | 1.02 | 1.43 | 105 |
| 4 | γ-glycidoxy propyl methyl diethoxy silane | (structure with Me, Si—OEt, OEt) | Shin-Etsu Chemical Co., Ltd. KBE-402; Nippon Unicar Co., Ltd. AZ-6165 | 278.4 | 0.98 | — | 128 |
| 5 | γ-glycidoxy propyl-triethoxy silane | (structure with OEt, Si—OEt, OEt) | Shin-Etsu Chemical Co., Ltd. KBE-403 | 278.4 | 1.00 | 1.43 | 125 |

Me: $CH_3$, Et: $C_2H_5$

When a silane coupling agent is used in the present invention, it is preferably added in the main component (A). From the viewpoint of enhancing adhesion of coating film to a base material and water resistance, the amount to be added is normally 0.1 to 4 parts by weight, and preferably 0.2 to 2 parts by weight per 100 parts by weight of the main component (A).

Based on the total weight of the coating composition of the present invention, the amount of silane coupling agent to be added is normally 0.1 to 15 wt %, preferably 0.5 to 5 wt %, and more preferably 1 to 3 wt %.

By adding a silane coupling agent in the coating composition in the above-mentioned amount, adhesion of the coating film formed from the composition to a base material is enhanced without peeling of the film at all even immersed in water for a prolonged time, and effectively prevents a metal base material (particularly a stainless base material) from pitting corrosion, crevice corrosion, dissimilar metal contact corrosion and stress corrosion. These effects are markedly revealed when a silane coupling agent having an epoxy group is added.

<Extender Pigment>

In the present invention, one or two or more kinds of extender pigments may be added to the main component (A) and/or the curing component (B).

As the extender pigment mentioned above, conventionally known compounds such as precipitated barium sulfate, potassium feldspar, kaolin, alumina white, clay, talc, bentonite, magnesium carbonate, barium carbonate, silica (particularly fine powder), mica powder, glass flake, stainless flake, aluminum flake, plastic flake and the like can be used. Among them talc, silica (particularly silica fine powder), mica and barium sulfate are preferably used in the present invention.

When such an extender pigment is added to the coating composition of the present invention, normally 5 to 80 parts by weight, preferably 20 to 70 parts by weight, and more preferably 40 to 60 parts by weight per 100 parts by weight of the main component (A) may be added.

<Coloring Pigment>

In the present invention, one or two or more kinds of coloring pigments may be added to the main component (A) and/or the curing component (B).

As the coloring pigment mentioned above, conventionally known inorganic pigments such as carbon black, titanium dioxide (titanium white), red iron oxide, iron oxide, iron hydroxide, ultramarine, or organic pigments such as cyanin blue, cyanin green, and the like may be used. Among them, titanium white, carbon black and red iron oxide may be preferably used in the present invention.

When such a coloring pigment is added to the paint composition of the present invention, normally 1 to 50 parts by weight, preferably 1 to 20 parts by weight, and more preferably 2 to 10 parts by weight per 100 parts by weight of the main component (A) may be added.

When at least one of the above-mentioned extender pigment and the coloring pigment is added to the anticorrosive coating composition of the present invention, the pigment volume content (PVC) of the total pigments including extender and coloring pigments is preferably 20 to 50%, and more preferably 25 to 45%, in order to maintain the effect of stress relaxation and water resistance of the coating film as well as coating workability at an appropriate level. If PVC is lower than the above range, the effect of pigment addition on stress relaxation tends to be insufficient. On the other hand, if PVC exceeds the above range, water resistance of the coating film and coating workability tend to decrease.

<Other Components>

In the main component (A) used in the present invention, various other components such as an anti-sagging agent (an anti-settling agent), a fibrous material, the surfactant described in JP-A-1990(H2)-298563, an anti-corrosive pigment, and the like may be suitably added.

Examples of the anti-sagging agent include conventionally known compounds such as organic clay-based wax such as a stearate, a lecithin salt, an alkyl sulfonate of Al, Ca, and Zn, polyethylene wax, amide wax, hydrogenated castor oil wax, polyamide wax, a mixture of hydrogenated castor oil wax with polyamide wax, synthetic fine powder silica, polyethylene oxide based wax, and the like. Among them, polyamide wax, synthetic fine powder silica, polyethylene oxide based wax and organic clay based wax are particularly preferable.

Examples of the commercial product of such anti-sagging agent include "DISPARLON 305", "DISPARLON 4200-20", "DISPARLON 6650" produced by Kusumoto Chemicals, Ltd. and "ASA T-250F" produced by Itoh Oil Chemicals Co., Ltd.

When using an antisagging agent in the present invention, 0.1 to 10 wt % of the antisagging agent may be added in the main component (A).

Production of the High Solid Type Paint Composition

The high solid type coating composition of the present invention can be produced by preparing separately the main component (A) and the curing component (B) in advance, and mixing and kneading them just before use.

The main component (A) can be prepared by mixing the resin, the pigment, the solvent and the additives composing thereof, followed by agitating and kneading the mixture. In this case, an SG mill or a high speed disperser may be used by keeping the mill base temperature at 55 to 60° C. for about 30 minutes to disperse the components as homogeneously as possible. On the other hand, the curing component (B) can be prepared by mixing the resin, the solvent and the like composing thereof and dispersing them using an agitator.

Use of the Coating Composition

By applying and curing the coating composition of the present invention on a base material surface, a coating film (layer) can be formed to provide the base material with various properties such as anticorrosive properties, oil resistance, solvent resistance, chemical resistance and water resistance. In other words, by coating the base material surface with the above-mentioned coating film, excellent oil resistance (particularly required for ship tanks) can be provided to the base material, and at the same time, pitting corrosion, crevice corrosion, dissimilar metal contact corrosion and stress corrosion of the base material can be prevented.

The paint composition of the present invention may be applied to the surface of a base material such as ship, steel structure, ship tank and the like, using the known methods such as airless spray, air spray, brushing, roller coating and the like. Examples of materials to which the coating composition of the present invention may be applied include steel, nonferrous metals (zinc, aluminum, stainless steel and the like), and the like. It is preferable that mild steel (e.g., SS400) or the like is subjected in advance to surface preparation by polishing using such a tool as grit blasting. For coating work, the coating composition may be suitably diluted with a thinner or the like.

The thickness of the above coating film after curing (drying) is not particularly limited. However, in order to provide enough anticorrosive properties efficiently, the thickness is normally 50 to 500 μm, and preferably 200 to 300 μm.

The coating composition of the present invention, as mentioned above, can provide a coating film of excellent properties on the base material surface. Therefore, it can be suitably applied to, for example, a seawater desalination facility, a part of a marine structure where maintenance work is difficult to implement, around a dam and a water gate, piping in a plant using seawater, river water and industrial water for cooling, a water storage, a water tank, a storage pool for nuclear fuel waste, and the like.

It can also be used for repair coating of a corroded surface of a base material coated with an anticorrosive coating film. Namely, local corrosion of a stainless steel base material can be prevented by forming an anticorrosive coating film on a welded part or a crevice, and by acting as an adhesive between the coating film surface and a stainless steel plate, it can prevent local corrosion stably for a long time and provide excellent anticorrosive properties.

Specifically, repairs of a stainless steel base material can be carried out, for example, by applying the epoxy resin composition of the present invention on the surface of a stainless steel base material having a welded part (weld line) or crevice, and bonding a stainless steel plate on the surface of the coating film before curing. The epoxy resin composition of the present invention may be further coated thereon.

Such a repair method can be applied without limitation to any structure made of stainless steel and is specifically applied to a water storage vessel, a water storage tank, a nuclear fuel waste storage pool and the like. As local corrosion tends to occur particularly if the nuclear fuel waste storage pool has a welded part (weld line) or a crevice on the surface of the base material inside the storage pool, application of the repair method using the epoxy resin composition of the present invention is effective.

When the coating composition of the present invention is applied, dried and cured, for example, it is inferred that ring opening of an epoxy group in the epoxy resin contained in the main component (A) occurs, and that the epoxy oxygen (O) is converted into a hydroxyl group (—OH), while the terminal carbon atom of the molecule forming the epoxy group reacts with an amino group (—$NH_2$) of the curing agent to form (—NH—) bond, or the like, thereby bonding to the curing agent.

EXAMPLES

The suitable embodiments of the present invention will be explained in further detail with reference to examples. However, the present invention is by no means restricted by these examples.

[Preparation of the Main Component, the Curing Component and the Coating Composition]

The coating compositions used in the Examples 1 to 2, and the Comparative Examples 1 to 6 were prepared as follows according to the compositions shown in Table 2.

First, all the constituents of the main component, that is, the resin, the pigment, the additives and the solvent were charged into a polyethylene container of 1 L volume and dispersed for 1 to 2 hours using a paint shaker with glass beads. Then the constituents of the curing component, namely the resin and the solvent were charged in a 1 Kg can and dispersed using a table agitator. Subsequently, the main component and the curing component were mixed, followed by addition of an appropriate amount of a thinner for epoxy compound (trade name: EPICON T-500 thinner) to prepare the coating composition.

[Preparation of a Test Plate]

A sand blasted steel plate of 2.3 mm×70 mm×150 mm in size made of SS400 (surface roughness: 40 to 75 μm) was prepared.

The coating composition prepared as described above was coated twice (once a day) on the surface of this steel plate using an air spray so that dry thickness of each coated film is 125 μm. After the plate was kept for drying at 23° C. for 10 days, the painted steel plate obtained (test plate) was subjected to a test for evaluating various properties of the coating film.

The test results were shown in Table 2, the test methods and the details of evaluation criteria are shown in Table 3 (remarks 14 to 20 in Table 2).

TABLE 2

|  |  |  | Example | | Comparative Example | | | | | |
|---|---|---|---|---|---|---|---|---|---|---|
|  | Composition (unit: parts by weight) |  | 1 | 2 | 1 | 2 | 3 | 4 | 5 | 6 |
| Main compo-nent (A) | (a1) Epoxy resin | E-834-85X *1 | 26.5 | — | 26.5 | 26.5 | Main component for epoxy resin coating material 1 *11 | Main component for epoxy resin coating material 2 *12 | Main component for epoxy resin coating material 3 *13 | — |
|  |  | E-834-85(PC) *2 | — | 26.5 | — | — |  |  |  | — |
|  | Epoxy resin | YD-128 *3 | — | — | — | — |  |  |  | 34.6 |
|  | Xylene resin | Nikanol L *4 | — | — | — | — |  |  |  | 10 |
|  | Coloring pigment | Titanium white | 4 | 4 | 4 | 4 |  |  |  | 20 |
|  |  | Carbon black | 0.03 | 0.03 | 0.03 | 0.03 |  |  |  | — |
|  | Extender pigment | Talc | 11.5 | 11.5 | 11.5 | 11.5 |  |  |  | 20 |
|  |  | Silica powder | 22.5 | 22.5 | 22.5 | 22.5 |  |  |  | — |
|  |  | Barium sulfate | 8.5 | 8.5 | 8.5 | 8.5 |  |  |  | — |
|  | Anti-sagging agent *5 |  | 1 | 1 | 1 | 1 |  |  |  | — |
|  | silane coupling agent *6 |  | 0.4 | 0.4 | 0.4 | 0.4 |  |  |  | — |
|  | solvent | Toluene | 5 | 5 | 5 | 5 |  |  |  | — |
|  |  | MIBK | 5.57 | 5.57 | 5.57 | 5.57 |  |  |  | — |
|  |  | subtotal | 85 | 85 | 85 | 85 | 85 | 82.2 | 86.6 | 84.6 |
| Curing compo-nent (B) | (b1) MXDA epoxy adduct | NAD 200P *7 | 7 | 7 | 14 | — | Curing component for coating material 1 *11 | Curing component for coating material 2 *12 | Curing component for coating material 3 *13 | — |
|  |  | Sunmide X-2100 *8 | — | — | — | — |  |  |  | 7.8 |
|  | (b2) Polyamide epoxy adduct | PA297P *9 | 7 | 7 | — | 14 |  |  |  | — |
|  |  | Ankamide 2589 *10 | — | — | — | — |  |  |  | 7.6 |
|  | Solvent |  | 1 | 1 | 1 | 1 |  |  |  | — |
|  |  | subtotal | 15 | 15 | 15 | 15 | 15 | 17.8 | 13.4 | 15.4 |
| Main component (A) + Curing Agent (B) |  | total | 100 | 100 | 100 | 100 | 100 | 100 | 100 | 100 |
|  |  | PVC | 36% | 36% | 36% | 36% | 36% | — | — | 17% |

|  |  | Example | | Comparative Example | | | | | |
|---|---|---|---|---|---|---|---|---|---|
| Test Result |  | 1 | 2 | 1 | 2 | 3 | 4 | 5 | 6 |
| Coating film color |  | gray | gray | gray | gray | gray | green | white | white |
| Drying properties | (In accordance with JIS: K5600-3-3) *14 | 4 | 4 | 4 | 4 | 4 | 4 | 4 | 2 |
| Flex resistance | (In accordance with JIS: K5600-5-1) *15 | 3 | 4 | 2 | 3 | 4 | 2 | 2 | 4 |
| Impact resistance | (In accordance with JIS: K5600-5-2) *16 | 4 | 4 | 2 | 4 | 4 | 2 | 2 | 4 |
| Brine resistance | (In accordance with JIS: K5600-6-1) *17 | 4 | 4 | 4 | 4 | 3 | 2 | 2 | 4 |
| Oil resistance | (In accordance with JIS: K5600-6-1) *18 | 4 | 4 | 4 | 4 | 4 | 4 | 4 | 3 |
| Solvent resistance | (In accordance with JIS: K5600-6-1) *19 | 4 | 4 | 4 | 3 | 3 | 2 | 2 | 1 |
| Chemical resistance | (In accordance with JIS: K5600-6-1) *20 | 4 | 4 | 4 | 4 | 4 | 4 | 4 | 2 |

Notes

*1 Epoxy resin "E-834-85X": produced by Ohtake-Meishin Chemical Co., Ltd. Epoxy equivalent weight = 250. Non-volatile content = 85% (xylene 15%).

*2 Epoxy resin "E-834-85 (PC)": produced by Ohtake-Meishin Chemical Co., Ltd. Epoxy equivalent weight = 270. Non-volatile content = 85% (xylene 15%).

*3 Epoxy resin "YD-128": produced by Tohto Kasei Co., Ltd. Epoxy equivalent weight = 190, Non-volatile content = 100%.

*4 Xylene resin "Nikanol L": produced by Mitsubishi Gas Chemical Co., Ltd.

*5 Anti-sagging agent (Amide wax) "ASA T-250F": produced by Itoh Oil Chemicals Co., Ltd.

*6 Silane coupling agent "KBM403": produced by Shin-Etsu Chemical Co., Ltd.

*7 MXDA epoxy adduct "NAD200P": produced by Ohtake-Meishin Chemical Co., Ltd. Active hydrogen equivalent weight = 136. Non-volatile content = 63% (solvent 37%).

*8 MXDA epoxy adduct "Sunmide X-2100": produced by Air Products Co., Ltd. Active hydrogen equivalent weight = 110. Non-volatile content = 100%.

*9 Polyamide epoxy adduct "PA297P": produced by Ohtake-Meishin Chemical Co., Ltd. Active hydrogen equivalent weight = 239/ Non-volatile content = 61%.

*10 Polyamide epoxy adduct "Ankamide 2589": produced by Air Products and Chemicals, Ltd. Active hydrogen equivalent weight = 100. Non-volatile content = 100%.

*11 Epoxy resin coating material 1 (used in Comparative Example 3): "Epicon T-500" produced by Chugoku Marine Paints Ltd. Main component = bisphenol type solid epoxy resin (epoxy equivalent weight = 475), extender pigment (talc, mica, barium sulfate), coloring pigment (red iron oxide or titanium white and carbon black), additives (anti-sagging agent, silane coupling agent solvent (toluene, MIBK (MEK)) are contained; Curing component = DETA epoxy adduct resin, solvent (butanol, toluene) are contained; Physical properties = good.

*12 Epoxy resin coating material 2 (used in Comparative Example 4): "SIGMAGUARD EHB" produced by SIGMA COATINGS Co., Ltd.; Main component = bisphenol type semi-solid epoxy resin, extender pigment (talc, mica, barium sulfate), coloring pigment (titanium white or cyanine green), additive (anti-sagging agent), solvent (xylene, butanol, solvent naphtha); Curing component = MXDA epoxy adduct resin, additives (tri-amino methylphenol, salicylic acid), solvent (methoxy propanol, isobutylmethyl ketone, xylene, butanol); Physical properties: good.

*13 Epoxy resin coating material 3 (used in Comparative Example 5): "Interline 604" produced by International Coatings Co., Ltd.; Main Component = bisphenol type semi-solid epoxy resin, extender pigment (tremolite, chrysotile, silica powder, barium sulfate), coloring pigment (titanium white), solvent (methyl n-ketone, solvesso); Curing component = cardanol based modified polyamine (phenalkamine), solvent (butanol); Physical properties = good.

*14 to *20 Test methods and evaluation criteria of the coating film are shown in the following Table 3.

TABLE 3

| Evaluation item | Test methods and evaluation criteria |
|---|---|
| Drying properties | In accordance with JIS K5600-3-2 (Test method of surface drying properties)<br>4: Curing and drying time is less than 24 hours at 5° C.<br>3: Curing and drying time is 24 hours or more and less than 36 hours at 5° C.<br>2: Curing and drying time is 36 hours or more and less than 48 hours at 5° C.<br>1: Curing and drying time is 48 hours or more at 5° C. |
| Flex resistance | In accordance with JIS K5600-5-1 (Test method of flex resistance)<br>4: No crack nor scaling is observed by bending of 10 mm radius.<br>3: Slight crack or scaling is observed by bending of 10 mm radius.<br>2: Crack or scaling is observed by bending of 10 mm radius.<br>1: Significant crack or scaling is observed by bending of 10 mm radius. |
| Impact resistance | In accordance with JIS 5600-5-2 (Test method of cupping resistance)<br>½ inch 1000 g × 50 cm<br>4: Peeling radius is less than 5 mm.<br>3: Peeling radius is 5 mm or more and less than 10 mm.<br>2: Peeling radius is 10 mm or more and less than 15 mm.<br>1: Peeling radius is 15 mm or more. |
| Brine resistance | In accordance with JIS 5600-6-1 (Test method of liquid resistance)<br>After 180-day immersing in an artificial brine (salt content 3%), with a cut reaching the base material in a lower part of test piece,<br>4: No stain nor blister is observed and creep width of the cut part is less than 8 mm.<br>3: No stain nor blister is observed and creep width of the cut part is 8 mm or more and less than 15 mm.<br>2: Slight stain or blister is observed.<br>1: Stain or blister is observed. |
| Oil resistance | In accordance with JIS 5600-6-1 (Test method of liquid resistance)<br>After 180-day immersing in kerosene or naphtha,<br>4: No stain nor blister is observed on the coating film and the coating film is softened slightly.<br>3: No stain nor blister is observed on the coating film and the coating film is softened heavily.<br>2: Slight stain or blister is observed on the coating film.<br>1: Stain or blister is observed on the coating film. |
| Solvent resistance | In accordance with JIS 5600-6-1 (Test method of liquid resistance)<br>After 180-day immersing in toluene, ethanol, MEK, ethyl acetate, EDC or PGM at room temperature,<br>4: No stain nor blister is observed on the coating film and the coating film is softened slightly.<br>3: No stain nor blister is observed on the coating film and the coating film is softened heavily.<br>2: Slight stain or blister is observed on the coating film.<br>1: Stain or blister is observed on the coating film. |
| Chemical resistance | In accordance with JIS 5600-6-1 (Test method of liquid resistance)<br>After 180-day immersing in 3% sulfuric acid at room temperature, or 180-day immersing in caustic soda at 40° C.,<br>4: No stain nor blister is observed on the coating film and the coating film is softened slightly.<br>3: No stain nor blister is observed on the coating film and the coating film is softened heavily.<br>2: Slight stain or blister is observed on the coating film.<br>1: Stain or blister is observed on the coating film. |

The invention claimed is:

1. A high solid anticorrosive coating composition comprising:
(A) a main component comprising a semi-solid state bisphenol epoxy resin (a1) having an epoxy equivalent weight of 260 to 280; and
(B) a curing component comprising an epoxy adduct of xylylenediamine (b1) and an epoxy adduct of polyamide (b2),
the curing component (B) comprising 50 to 200 parts by weight of the epoxy adduct of polyamide (b2) per 100 parts by weight of the epoxy adduct of xylylenediamine (b1),
wherein the total amount of the bisphenol epoxy resin (a1), the epoxy adduct of xylylenediamine (b1) and the epoxy adduct of polyamide (b2), {(a1)+(b1)+(b2)}, in the coating composition is 15 to 45 wt %.

2. The high solid anticorrosive coating composition as set forth in claim 1, wherein the curing component (B) comprises 70 to 150 parts by weight of the epoxy adduct of polyamide (b2) per 100 parts by weight of the epoxy adduct of xylylenediamine (b1).

3. The high solid anticorrosive coating composition as set forth in claim 1, wherein the ratio of active hydrogen group in the curing component (B) to the epoxy group of the main component (A) is 0.8 to 1.0.

4. The high solid anticorrosive coating composition as set forth in claim 1, wherein the main component (A) or the curing component (B) comprises a silane coupling agent.

5. The high solid anticorrosive coating composition as set forth in claim 4, wherein the silane coupling agent is contained at 0.1 to 4 parts by weight per 100 parts by weight of the main component (A).

6. The high solid anticorrosive coating composition as set forth in claim 1, wherein the main component (A) or the curing component (B) comprises an extender pigment.

7. The high solid anticorrosive coating composition as set forth in claim 6, wherein the extender pigment is at least one selected from the group consisting of silica, talc, mica and barium sulfate.

8. The high solid anticorrosive coating composition as set forth in claim 6, wherein the extender pigment is contained at 20 to 70 parts by weight per 100 parts by weight of the main component (A).

9. The high solid anticorrosive coating composition as set forth in claim 1, wherein the main component (A) or the curing component (B) comprises a coloring pigment.

10. The high solid anticorrosive coating composition as set forth in claim 9, wherein the coloring pigment is at least one selected from the group consisting of titanium white, carbon black and red iron oxide.

11. The high solid anticorrosive coating composition as set forth in claim 9, wherein the coloring pigment is contained at 1 to 20 parts by weight per 100 parts by weight of the main component (A).

12. The high solid anticorrosive coating composition as set forth in claim 6, wherein the total pigment volume content (PVC) including the extender pigment and the coloring pigment in a coating composition is in the range of 20 to 50%.

13. The high solid anticorrosive coating composition as set forth in claim 12, wherein the total pigment volume content (PVC) is in the range of 25 to 45%.

14. The high solid anticorrosive coating composition as set forth in claim 1, wherein the total amount of the bisphenol epoxy resin (a1), the epoxy adduct of xylylenediamine (1) and the epoxy adduct of polyamide (b2), {(a1)+(b1)+(b2)}, in the coating composition is 20 to 40 wt %.

15. A coating film formed from the high solid anticorrosive coating composition as set forth in claim 1.

16. An anticorrosive coating film formed from the high solid anticorrosive coating composition as set forth in claim 1.

17. An anticorrosive coating film for ships formed from the high solid anticorrosive coating composition as set forth in claim 1.

18. An anticorrosive coating film for ship tanks formed from the high solid anticorrosive coating composition as set forth in claim 1.

19. A base material coated with an anticorrosive coating film formed from the high solid anticorrosive coating composition as set forth in claim 1.

20. A ship tank coated with an anticorrosive coating film formed from the high solid anticorrosive coating composition as set forth in claim 1.

21. A method of preventing corrosion by coating with a coating film formed from the high solid anticorrosive coating composition as set forth in claim 1.

* * * * *